United States Patent [19]
Circello et al.

[11] Patent Number: 5,872,940
[45] Date of Patent: Feb. 16, 1999

[54] PROGRAMMABLE READ/WRITE ACCESS SIGNAL AND METHOD THEREFOR

[75] Inventors: Joseph C. Circello, Phoenix, Ariz.;
James G. Gay, Pflugerville, Tex.;
Clinton T. Glover; Kevin M. Traynor, both of Austin, Tex.

[73] Assignee: Motorola, Inc., Schaumburg, Ill.

[21] Appl. No.: 627,669

[22] Filed: Apr. 1, 1996

[51] Int. Cl.[6] .................................................. G06F 13/38
[52] U.S. Cl. .......................... 395/306; 395/310; 711/100; 711/111
[58] Field of Search .................................... 395/284, 882, 395/823, 800, 401, 306, 250, 310; 257/692

[56] References Cited

U.S. PATENT DOCUMENTS

| | | | |
|---|---|---|---|
| 4,933,845 | 6/1990 | Hayes | 364/200 |
| 5,265,243 | 11/1993 | Povenmire et al. | 395/550 |
| 5,408,129 | 4/1995 | Farmwald et al. | 257/692 |
| 5,444,852 | 8/1995 | Nakabayashi | 395/823 |
| 5,448,744 | 9/1995 | Eifert et al. | 395/800 |
| 5,535,349 | 7/1996 | Boaz et al. | 395/401 |
| 5,557,757 | 9/1996 | Gephardt et al. | 395/300 |
| 5,590,287 | 12/1996 | Zeller et al. | 395/250 |

*Primary Examiner*—Tod R. Swann
*Assistant Examiner*—Fred F. Tzeng

[57] ABSTRACT

A system bus controller (103) within a processor (101) includes programmable logic for different modes of chip enable signals on a per-address-space basis. This allows for a "glueless" interface (107) between the processor (101) and different types of external devices (111, 112, 113), such as memory devices. A chip select register value 604, 608, 612 is preprogrammed with respect to each external device coupled to the processor (101). This preprogrammed register value 604, 608, 612 is used by the system bus controller (103) to uniquely configure a read/write access signal to be sent to each of the external devices (111, 112, 113).

16 Claims, 5 Drawing Sheets

5,872,940

PROGRAMMABLE READ/WRITE ACCESS SIGNAL AND METHOD THEREFOR

TECHNICAL FIELD

The present invention relates in general to data processing systems, and in particular, to a programmable read/write access signal delivered from a processor.

BACKGROUND INFORMATION

A processor (hereinafter also referred to as a CPU (central processing unit)) is typically implemented on an integrated circuit ("IC") and is coupled to various external resources (devices) by a system bus. Such external devices may include flash memory devices, read-only memory ("ROM") devices, random access memory ("RAM") devices, dynamic random access memory ("DRAM") devices, universal asynchronous receiver/transmitter ("UART") devices, application specific integrated circuits ("ASIC"), timer devices, other microprocessors, direct memory access ("DMA") channels, hard disks, tape drives, CD-ROMs, network communications adapters, user interfaces, and display devices. These various devices are the eyes, ears, mouth, arms, and legs to the processor's brain. In other words, a processor alone, with no means of external communication, is practically a worthless hunk of silicon.

The system bus, which couples all of these various external devices to the processor, is typically a plurality of transmission lines operating in parallel. It could be said that the equivalent of the bus in the human body is the central nervous system.

Since all or most of the transmission lines of the system bus are coupled to the processor and to all of the various external devices, an addressing scheme is needed so that only the intended destination of a set of data or instructions transmitted from the processor or from one of the external devices is received by that intended destination. The set of addresses for a particular system can be parsed into a plurality of address spaces. An address space is made up of one or more addresses. A particular address space may be dedicated to a particular external device. The address spaces are generally indicated by asserting a chip select signal to a specific device.

When the processor desires to read information located at a particular address space, or desires to write information to a particular address space, a bus protocol is initiated between the processor and the external device corresponding to the particular address space. This bus protocol typically includes an alert signal to the external device that a read or write access is about to occur, and a notification to the external device to indicate whether or not the access is a read or a write. This bus protocol is produced by a system bus controller located in the processor and is coupled between the core circuitry of the processor (hereinafter referred to also as the "core") and the system bus. The system bus controller acts as an interface between read and write requests received from the core and the system bus.

A problem occurs when data processing systems are configured using a processor and external devices produced by different manufacturers, since there is no general standard bus protocol uniformly implemented by all manufacturers. Thus, different external devices may require different bus protocol signals.

For example, different types of external memory devices (one type of external device) may require differing values of read/write access signals in order to interface correctly with the processor. Prior art processors are rigid in that they produce only one value for the read/write access signal. If this signal is asserted high by the processor for a write access to an external device, but the external device requires that this received signal be asserted low, then the processor and the external device will not be able to interface correctly. For example, the external device may operate as if the write access from the processor is a read access.

Prior art solutions to this problem have been the implementation of additional external logic circuitry implemented on the system bus between the processor and the external device. Since such external logic circuitry requires space (increases cost) on an IC or a printed circuit board ("PCB") and increases associated overhead costs, it is desirable not to include such external logic circuitry. The external logic circuitry typically introduces additional time delay into the system bus access, thereby lowering the overall system performance. Therefore, there is a need in the art for a technique for interfacing a processor to one or more external devices, regarding read/write access signals, without requiring additional external logic circuitry. In other words, what is needed in the art is a "glueless" interface between such a processor and one or more external devices.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
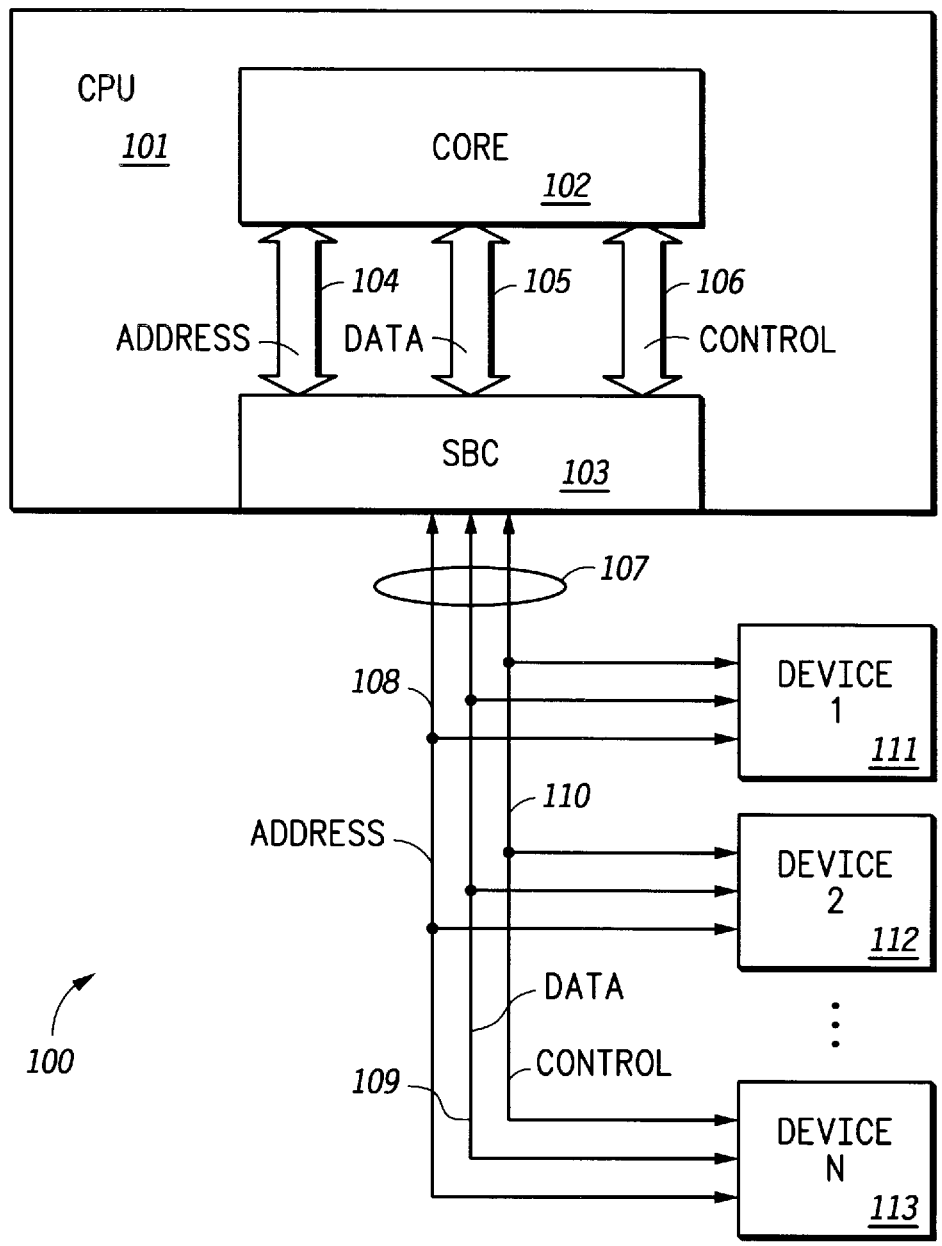
FIG. 1 illustrates a data processing system configured in accordance with one embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated data processing system 100 configured in accordance with the present invention. Processor (CPU) 101 is coupled to N (where N is a positive integer) external devices 111–113 by system bus 107, which is a "glueless" interface. In other words, as briefly discussed above, and as discussed further below, external logic circuitry is not required to be implemented anywhere along system bus 107 in order that CPU 101 can properly interface with each of the N external devices 111–113.

CPU 101 includes processor core 102, which typically comprises various execution units and related circuitry. Core 102 is coupled to system bus controller ("SBC") 103 by address bus 104, data bus 105, and control bus 106. SBC 103 operates as a bus interface unit between core 102 and system bus 107.

System bus 107 includes address bus 108, data bus 109, and control bus 110. System bus 107 couples CPU 101 to each of the N external devices 111–113.

As far as CPU 101 is concerned, each of the N external devices 111–113 resides in an address space to which read and write accesses may be conducted.

Figure 2:
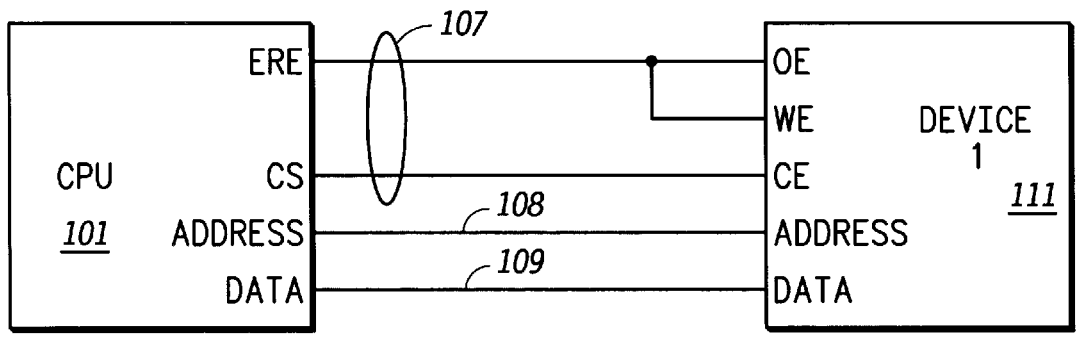
FIGS. 2–4 illustrate the interfacing of a processor with different external devices and their unique bus protocol signalling requirements.

Referring next to FIG. 2, there is illustrated a coupling of CPU 101 to external device 111. A portion of control bus 110 is illustrated in more detail to show the unique requirement by external device 111 for control signals for interfacing CPU 101 and external device 111. External device 111 requires that the read/write access signal, labeled as ERE, from CPU 101 is received by the output enable (OE) and write enable (WE) pins of external device 111. Note, the chip select (CS) signal of CPU 101 is received by the chip enable (CE) pin of external device 111.

Figure 3:
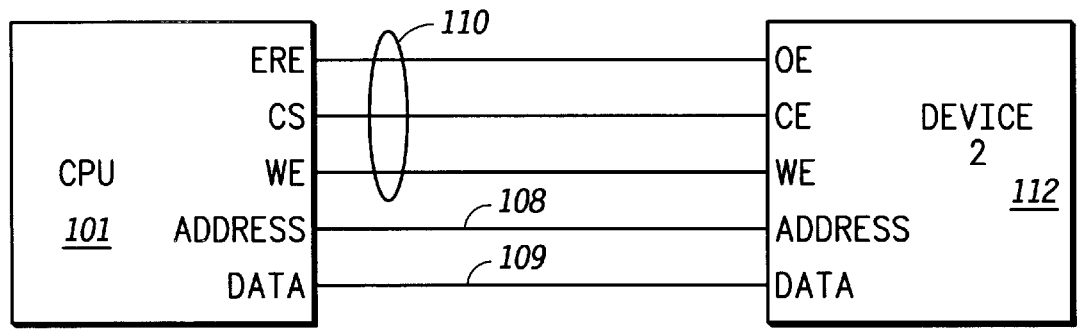

FIG. 3 illustrates a coupling of CPU 101 to external device 112, which is a different external device than external device 111. External device 112 requires that the ERE signal from CPU 101 be received only by the OE pin of external device 112. The WE pin of external device 112 is coupled to the WE pin of CPU 101.

Figure 4:
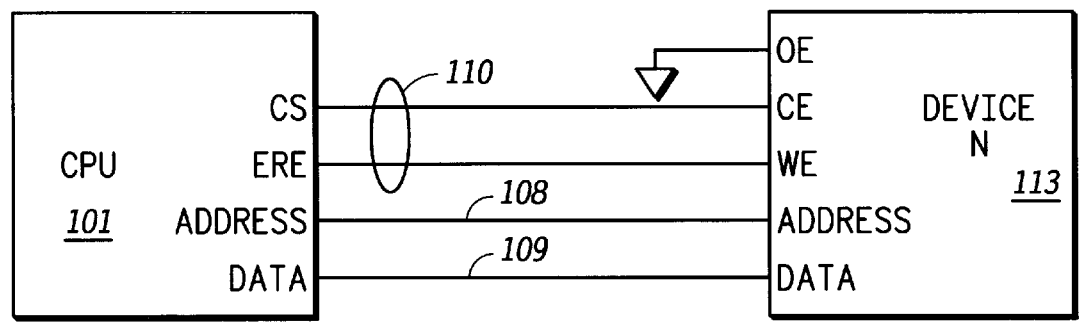

FIG. 4 illustrates yet another example of a coupling of CPU 101 to an external device different than external devices 111 and 112. External device 113 has its OE pin tied to ground, and the WE pin of external device 113 receives the ERE signal from CPU 101.

External devices 111–113 may comprise different memory devices such as SRAM, ROM or flash memory chips. Such different memory chips often require different control interfaces in order to communicate with a processor with respect to read and write accesses. For example, for a write access from CPU 101, external device 112 may require that the ERE signal be asserted low, while external device 113 may require that, for a write access, the ERE signal be asserted high. As discussed above, prior art processors are rigidly configured so that, for any access (read or write), the ERE signal is always asserted at the same level. For example, in a prior art processor, for a write access, the ERE signal may always be asserted low. In such a case, for that prior art processor to interface properly with external device 113, an external logic circuit, such as an inverter circuit, would have to be implemented between the ERE pin of the processor and the WE pin of external device 113. The present invention solves the foregoing problem without requiring such additional external logic circuitry. In other words, a "glueless" interface can be implemented between CPU 101 and all of external devices 111–113.

Figure 5:
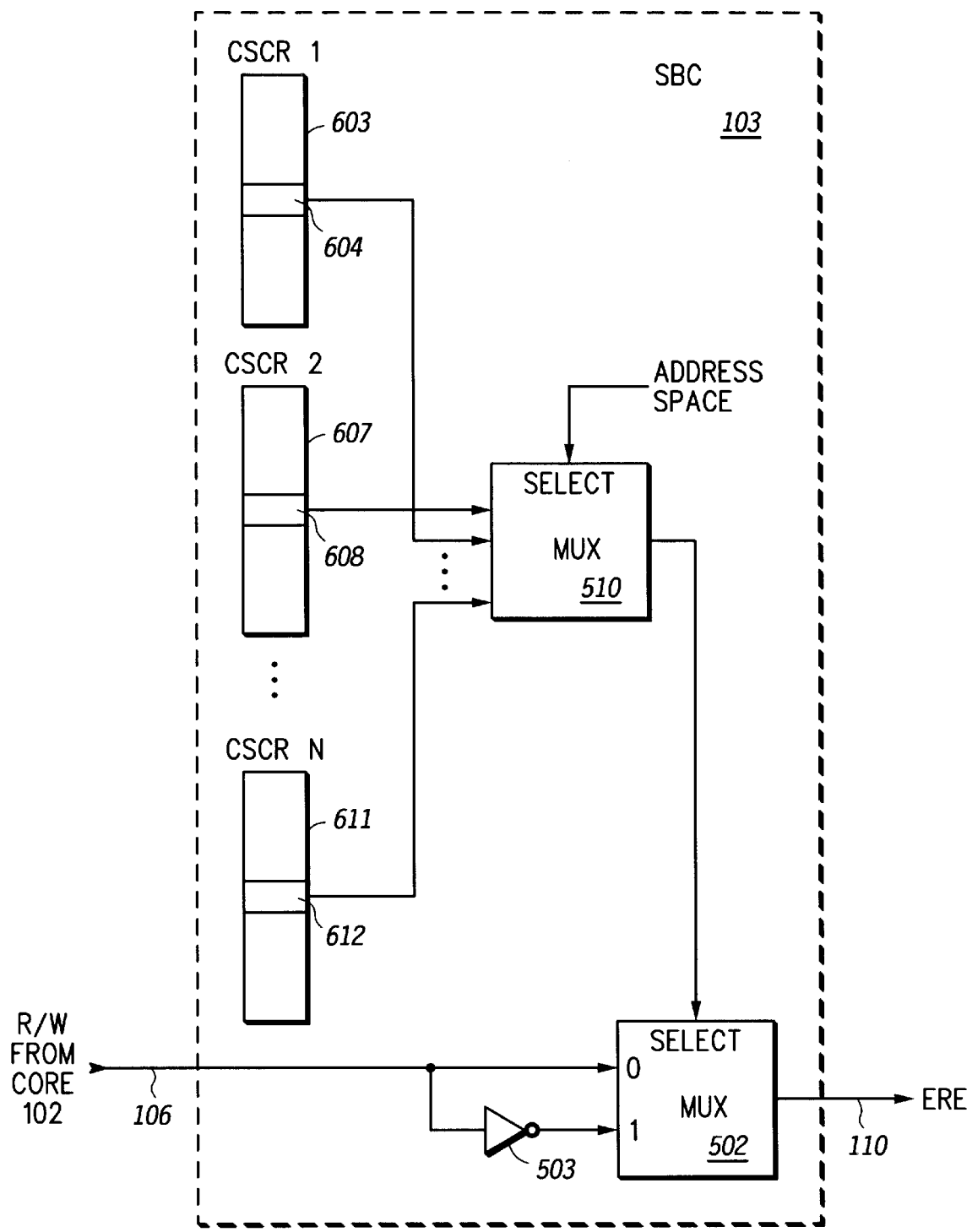
FIG. 5 illustrates an implementation of the present invention within a system bus controller.

Referring next to FIG. 5, there is illustrated one embodiment of the present invention implemented within SBC 103. SBC 103 receives a read or write access (labeled R/W) from core 102 on control bus 106. For example, core 102 may request that it be able to write information to an address space, corresponding to an address received by SBC 103 on address bus 104 (see FIG. 1), to one of external devices 111–113, corresponding to the address space. Such a write access from core 102 on bus 106 could be implemented as an asserted-high or an asserted-low signal. This signal is received by the "0" input of multiplexer circuit (mux) 502 within SBC 103. This write access signal is also inverted by inverter 503, which has its output coupled to the "1" input of mux 502. Selection of either one of these inputs to be output as the ERE signal from SBC 103 is performed as a function of a register value within one of bits 604, 608, or 612 in registers 603, 607, or 611, respectively. Registers 603, 607, and 611 may each be a chip select control register (CSCR) implemented within SBC 103. Bit values within a CSCR define the external bus control signals for an external device for a given address space. Selection of one of bits 604, 608, or 612 is made by multiplexer circuit 510 as a function of the specified address space of the read or write access from core 102. Each of registers 603, 607 and 611 is dedicated to a different address space within system 100.

The values within bits 604, 608, and 612 (which each may be comprised of one or more bits) have been preprogrammed into registers 603, 607, and 611, respectively, at the time data processing system 100 is configured by the program executing on CPU 101. For example, a system engineer may purchase CPU 101 configured in accordance with the present invention for coupling within system 100 to one or more of external devices 111–113. At that time, the system engineer will take note of the particular read/write access protocol requirements of the various external devices 111–113 and will generate the appropriate program instructions to configure the required values within each of bits 604, 608, and 612 pertaining to each of external devices 111–113, respectively, so that SBC 103 produces the required ERE signal value levels needed by each of the external devices (address spaces). Typically, each address space (external device) will have a dedicated set of chip select registers (see FIG. 6). Note that one skilled in the art will be able to perform this preprogramming feature. Alternatively, programming of bits 604, 608, and/or 612 may occur during a reset of the integrated circuit.

Figure 6:
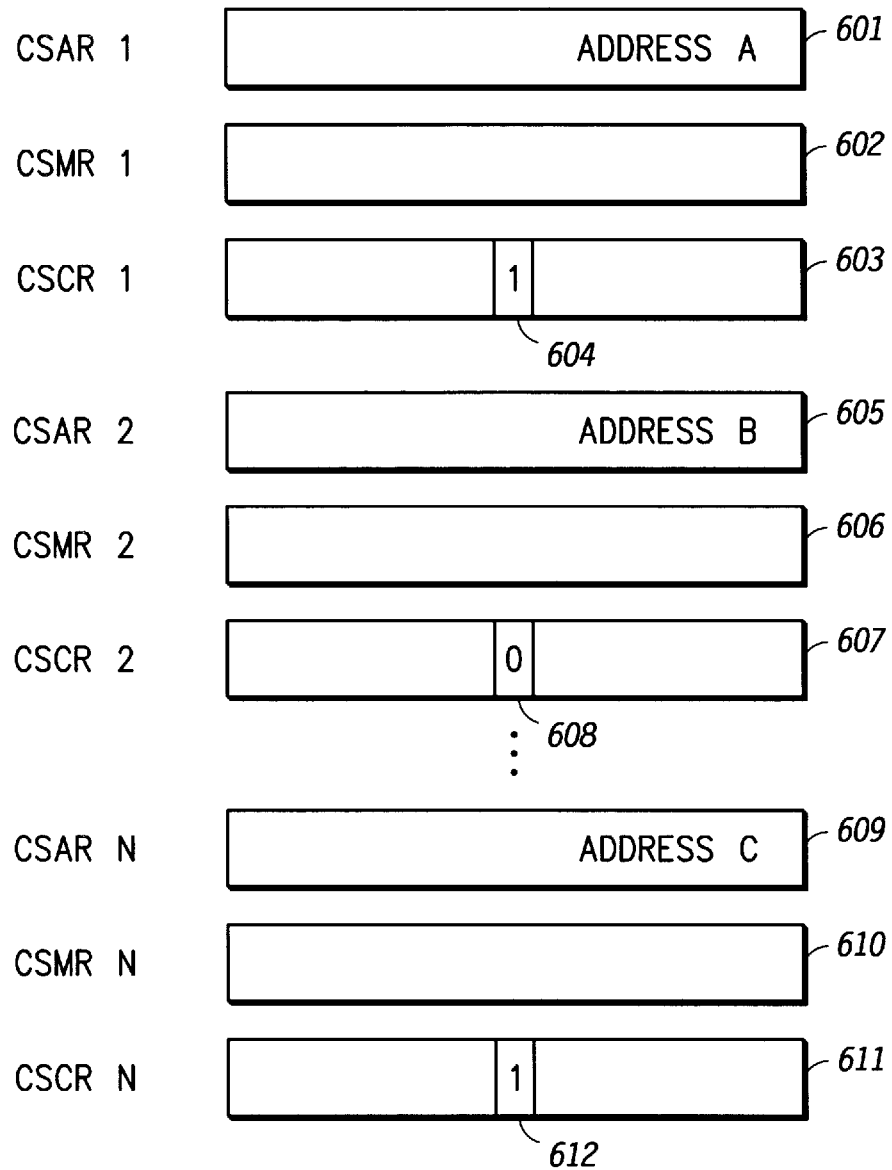
FIG. 6 illustrates an example of an implementation of the present invention.

Referring next to FIG. 6, there is illustrated an example of an implementation of the present invention. Upon system configuration, chip select registers 601–603 are dedicated to external device 111, chip select registers 605–607 are dedicated to external device 112, and chip select registers 609–611 are dedicated to external device 113. Therefore, when an address indicates one of external devices 111, 112 or 113 should be accessed, a set of chip select registers corresponding to the selected one of the external devices will provide control information during that access. Registers 601, 605, and 609 may be typical chip select address registers for storing the address pertaining to a particular read or write access received from core 102. Registers 602, 606, and 610 may be optional mask registers used in combination with the chip select address registers for defining address spaces within data processing system 100. And, as noted previously, registers 603, 607, and 611 are chip select control registers for containing various control bits for directing the particular control signals to be sent to their respective external devices.

Also as noted previously, register bits 604, 608, and 612 are the ERE bits used within their respective CSCR registers for determining the required ERE signal to be sent to the corresponding external device. For example, mux 502 may receive the register value in bit 604 for determining the signal level of the ERE signal to be sent to external device 111. The table shown below illustrates an example of how these ERE bits are programmed for proper operation of read and write accesses from CPU 101 to external devices 111–113 as shown in FIGS. 2, 3 and 4.

|       | CSCR1[ERE] | CSCR2[ERE] | CSCRN[ERE] |
|-------|------------|------------|------------|
|       | 1          | 0          | 1          |
| Read  | 0          | 1          | 0          |
| Write | 1          | 0          | 1          |

If the ERE bit value is a "0", then the ERE signal output will be asserted low for a write access and asserted high for a read access. If the ERE bit value is a 1, then a read access will result in an ERE signal asserted low, while a write access will result in an ERE signal asserted high. An example of this is further illustrated in FIG. 7 by the timing diagram, which illustrates three consecutive write accesses and three consecutive read accesses requested by core 102. In the first write access, a write access is to occur to address space A. Address A is stored within register 601. This will cause a chip select signal (CS1) to be sent from SBC 103 to external device 111. Since the register value within bit 604 of register 603 is a "1" bit, mux 502 will select the "1" input, which is the inverted signal of the write access signal received from core 102. Therefore, the ERE signal sent to external device 111 will be asserted high.

When the write access to address B is received, the chip select signal CS2 will be asserted low and sent to external device 112. Since the register value within bit 608 is a "0" bit, the ERE signal sent from SBC 103 to external device 112 will be asserted low.

When the write access from core 102 is received and intended for address C, which corresponds to external device 113, chip select signal CSN will be asserted low and sent to external device 113. Since the register value within bit 612 is a "1" bit, the ERE signal sent from SBC 103 to external device 113 will be asserted high.

Figure 7:
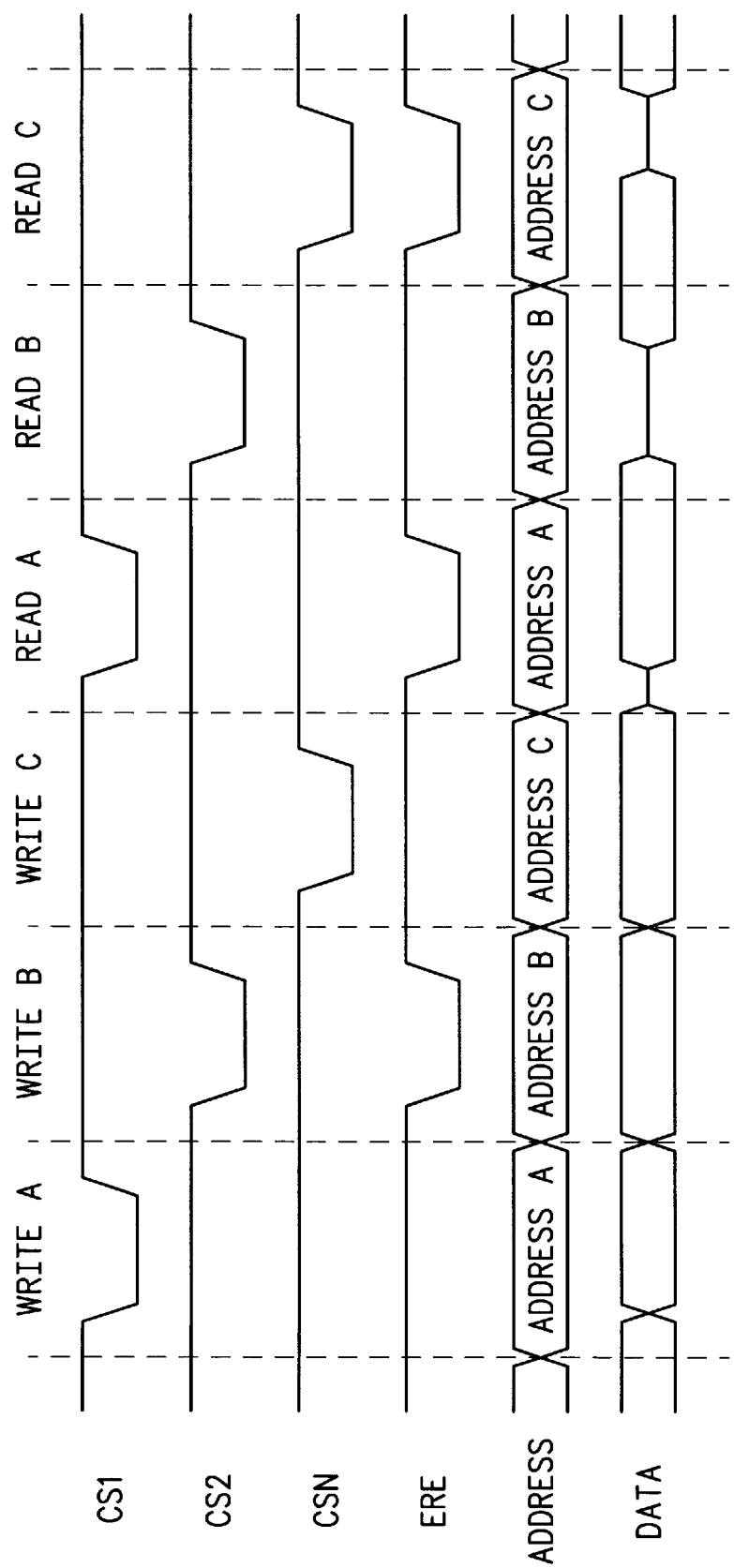
FIG. 7 illustrates a timing diagram of an example implementation of the present invention.

As shown in FIG. 7, the value for the ERE signal is opposite for the read accesses as it was for the write accesses for the same set of addresses.

An advantage of the present invention is that the ERE signal sent from SBC 103 to the various external devices 111–113 is programmable so that external logic circuitry is not required in order to modify this ERE signal before being received by each of external devices 111–113, which may have differing requirements for the level of this ERE signal.

Although the present invention and its advantages have been described in detail, it should be understood that various changes, substitutions and alterations can be made herein without departing from the spirit and scope of the invention as defined by the appended claims.

We claim:

1. A processor comprising:

a core;

a system bus controller adaptable for coupling said processor to a system bus; and a bus circuit for coupling said core to said system bus controller, wherein said system bus controller comprises:

a circuit operable for outputting a read/write access signal onto said system bus in response to a read or write request received from said core for a specified address space, wherein a value of said read/write access signal is a function of said specified address space and dependent upon a preprogrammed register value of at least one bit stored in a chip control register dedicated to said specified address space corresponding to an external device coupled to said system bus, and wherein said preprogrammed register value is dependent upon a particular read/write protocol of said external device.

2. The processor as recited in claim 1, wherein said external device is a memory device.

3. The processor as recited in claim 1, wherein said external device is a UART.

4. The processor as recited in claim 1, wherein said external device is another processor.

5. The processor as recited in claim 1, wherein said external device is an ASIC.

6. The processor as recited in claim 1, wherein said read/write access signal is asserted low on read accesses when received by an output enable pin of said external device, and wherein said read/write access signal is asserted low on write accesses when received by a read/write pin of said external device.

7. The processor as recited in claim 1, wherein said read or write request from said core is for information residing at said specified address space.

8. The processor as recited in claim 1, wherein said system bus comprises a glueless interface between said processor and said external device.

9. A method for formulating a read or write access from a processor to an address space, said method comprising the steps of:

receiving from said processor a read or write access for information resident at said address space; and coding a read/write access signal in response to receipt of said read or write access for said information resident at said address space, wherein said coding of said read/write access signal is programmable on a per address space basis, and wherein a value coded for said read/write access signal is dependent upon a read/write access protocol of said address space, wherein said read/write access protocol is the unique bus protocol signaling requirements required for a read/write access between said processor and an external device corresponding to said address space.

10. The method as recited in claim 9, further comprising the step of:

transmitting said read/write access signal from said processor over a glueless interface to a device corresponding to said address space.

11. The method as recited in claim 10, wherein said read/write access signal may be asserted low or high for a write access depending upon a particular write access protocol requirement of said device.

12. The method as recited in claim 10, wherein said read/write access signal may be asserted low or high for a read access depending upon a particular read access protocol requirement of said device.

13. The method as recited in claim 9, wherein said address space corresponds to a storage device.

14. The method as recited in claim 9, wherein said coding step comprises the step of:

reading a register value which has been preprogrammed as a function of a particular read/write access protocol corresponding to said address space, wherein a value of said read/write access signal is dependent upon said register value.

15. The method as recited in claim 14, wherein said register value is stored in one or more bits of a chip select control register dedicated to said address space.

16. A processor comprising:

a core;

a system bus controller adaptable for coupling said processor to a system bus; and bus circuitry for coupling said core to said system bus controller, wherein said system bus controller comprises:

circuitry for receiving from said processor a read or write access for information resident at a specified address space;

circuitry for coding a read/write access signal in response to receipt of said read or write access for said information resident at said specified address space, wherein said coding of said read/write access signal is programmable on a per address space basis, wherein a value coded for said read/write access signal is dependent upon a particular read/write access protocol of said address space, wherein said read/write access protocol is the unique bus protocol signaling requirements required for a read/write access between a processor and the external device corresponding to the particular address space; and circuitry for transmitting said read/write access signal from said processor over a glueless interface to a device corresponding to said address space, wherein said coding circuitry comprises circuitry for reading a register value which has been preprogrammed as a function of said particular read/write access protocol of said address space, wherein a value of said read/write access signal is dependent upon said register value, wherein said register value is stored in at least one bit of a chip select control register dedicated to said address space.

* * * * *